(12) United States Patent
Gou et al.

(10) Patent No.: US 12,101,190 B2
(45) Date of Patent: Sep. 24, 2024

(54) TRANSMISSION PRIORITY DETERMINATION METHOD AND APPARATUS, AND COMPUTER READABLE STORAGE MEDIUM

(71) Applicant: ZTE CORPORATION, Shenzhen (CN)

(72) Inventors: Wei Gou, Shenzhen (CN); Peng Hao, Shenzhen (CN); He Huang, Shenzhen (CN); Fei Dong, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 313 days.

(21) Appl. No.: 17/438,880

(22) PCT Filed: Mar. 23, 2020

(86) PCT No.: PCT/CN2020/080646
§ 371 (c)(1),
(2) Date: Sep. 13, 2021

(87) PCT Pub. No.: WO2020/192624
PCT Pub. Date: Oct. 1, 2020

(65) Prior Publication Data
US 2022/0158769 A1    May 19, 2022

(30) Foreign Application Priority Data
Mar. 28, 2019   (CN) .......................... 201910246492.5

(51) Int. Cl.
*H04L 1/1812* (2023.01)
*H04L 5/00* (2006.01)
(Continued)

(52) U.S. Cl.
CPC .......... *H04L 1/1812* (2013.01); *H04L 5/0053* (2013.01); *H04W 72/23* (2023.01); *H04W 72/569* (2023.01); *H04W 80/02* (2013.01)

(58) Field of Classification Search
CPC .. H04L 1/1812; H04L 5/0053; H04W 72/569; H04W 72/23; H04W 80/02
See application file for complete search history.

(56) References Cited

U.S. PATENT DOCUMENTS

| | | | |
|---|---|---|---|
| 2012/0127869 A1* | 5/2012 | Yin ....................... | H04W 28/06 370/252 |
| 2015/0106674 A1 | 4/2015 | Chen et al. | |

(Continued)

FOREIGN PATENT DOCUMENTS

| | | |
|---|---|---|
| CN | 101119184 A | 2/2008 |
| CN | 101815355 A | 8/2010 |

(Continued)

OTHER PUBLICATIONS

International Search Report for Application No. PCT/CN2020/080646, dated May 27, 2020, 8 pages including English translation.

(Continued)

*Primary Examiner* — Duc C Ho
(74) *Attorney, Agent, or Firm* — Morgan, Lewis & Bockius LLP

(57) ABSTRACT

Provided are a method and apparatus for determining a transmission priority and a computer-readable storage medium. The method includes that a transmitter determines a priority of a Hybrid Automatic Repeat reQuest (HARQ) process and that the transmitter transmits at least one of a traffic channel or a control channel according to the priority of the HARQ process.

18 Claims, 4 Drawing Sheets

S110
The transmitter determines a priority of an HARQ process

S120
The transmitter transmits at least one of a traffic channel or a control channel according to the priority of the HARQ process

(51) Int. Cl.
  *H04W 72/23* (2023.01)
  *H04W 72/566* (2023.01)
  *H04W 80/02* (2009.01)

(56) References Cited

U.S. PATENT DOCUMENTS

| | | | |
|---|---|---|---|
| 2015/0208404 A1 | 7/2015 | Yie et al. | |
| 2017/0273056 A1 | 9/2017 | Papasakellariou | |
| 2017/0318595 A1 | 11/2017 | Dinan et al. | |
| 2018/0083742 A1 | 3/2018 | Pani et al. | |
| 2018/0262302 A1* | 9/2018 | Bergström | H04L 1/1896 |
| 2019/0306922 A1* | 10/2019 | Xiong | H04W 72/21 |

FOREIGN PATENT DOCUMENTS

| | | |
|---|---|---|
| CN | 102447549 A | 5/2012 |
| CN | 106130701 A | 11/2016 |
| CN | 106134263 A | 11/2016 |
| CN | 107734688 A | 2/2018 |
| CN | 10794998 A | 4/2018 |
| CN | 107949998 A | 4/2018 |
| CN | 109496458 A | 3/2019 |
| EP | 3100535 A1 | 12/2016 |
| WO | WO-2013082785 A1 | 6/2013 |
| WO | WO2015116866 A1 | 8/2015 |

OTHER PUBLICATIONS

Nokia et al., "Summary of Friday offline discussion on UL/DL intra-UE prioritization/multiplexing", 3GPP TSG RAN WG1 #96, R1-1903818, Mar. 1, 2019 (Mar. 1, 2019), the main body, sections 2-5.
Chinese Office Action for Application No. 201910246492.5, dated Dec. 27, 2022, 12 pages including translation.
Chinese Search Report for Application No. 201910246492.5, dated Dec. 13, 2022, 4 pages including translation.
Extended European Search Report for Application No. 20777724.4, dated Nov. 18, 2022, 14 pages.
Nokia et al., "On enchanced HARQ-ACK feedback for URLLC", 3GPP TSG RAN WG1 Meeting #94-bis, R1-1810667, Oct. 8-12, 2018, Chengdu, P.R. China, 4 pages.
Chinese Office Action for Application No. 201910246492.5, dated Jun. 17, 2022, 10 pages including translation.
Chinese Search Report for Application No. 201910246492.5, dated May 11, 2022, 5 pages including translation.
Office Action in Korean Application No. 10-2021-7034849, dated Sep. 19, 2023, 10 pages including English translation.
Vivo, "DL intra UE Tx prioritization for URLLC", 3GPP TSG RAN WG1 #96, R1-1901699, Athens, Greece, Feb. 25-Mar. 1, 2019.
Sony, "Considerations on UL Intra-UE Tx Multiplexing", 3GPP TSG RAN WG1 #96, R1-1902182, Athens, Greece, Feb. 25-Mar. 1, 2019.

* cited by examiner

TRANSMISSION PRIORITY DETERMINATION METHOD AND APPARATUS, AND COMPUTER READABLE STORAGE MEDIUM

CROSS-REFERENCES TO RELATED APPLICATIONS

This is a National Stage Application, filed under 35 U.S.C. 371, of International Patent Application No. PCT/CN2020/080646, filed on Mar. 23, 2020, which is based on and claims priority to Chinese Patent Application No. 201910246492.5 filed with the CNIPA on Mar. 28, 2019, the disclosure of which is incorporated herein by reference in its entirety.

TECHNICAL FIELD

The present application relates to the technical field of radio communications networks, for example, a method and apparatus for determining a transmission priority and a computer-readable storage medium.

BACKGROUND

In a process of traffic interaction between a user equipment (UE) and a base station, various traffic has different requirements, so multiple traffic transmissions may exist at the same time. Therefore, determining a transmission priority of each traffic plays an important role in avoiding a time domain overlap in the traffic interaction. However, there is currently no detailed discussion on how to determine the transmission priority of the each traffic.

SUMMARY

The present application provides a method and apparatus for determining a transmission priority and a computer-readable storage medium so that a transmission priority can be determined to ensure the transmission having a higher priority in a case where preparation processes or transmission processes of at least two transmissions overlap.

An embodiment of the present application provides a method for determining a transmission priority. The method includes the steps described below.

A transmitter determines a priority of a Hybrid Automatic Repeat reQuest (HARQ) process.

The transmitter transmits at least one of a traffic channel or a control channel according to the priority of the HARQ process.

An embodiment of the present application provides an apparatus for determining a transmission priority. The apparatus includes a priority determination module and a transmission module.

The priority determination module is configured to determine a priority of a Hybrid Automatic Repeat reQuest (HARQ) process.

The transmission module is configured to transmit at least one of a traffic channel or a control channel according to the priority of the HARQ process.

An embodiment of the present application provides a computer-readable storage medium. The storage medium is configured to store computer programs. When the computer programs are executed by a processor, any one of the methods of the embodiments of the present application is implemented.

More description of the preceding embodiments and other aspects of the present application and the implementations thereof is provided in the BRIEF DESCRIPTION OF DRAWINGS, DETAILED DESCRIPTION, and claims.

DETAILED DESCRIPTION

Embodiments of the present application are described below in conjunction with the drawings.

With the development of radio communications technologies, the Ultra-Reliable and Low Latency Communications (URLLC) transmission comes into being. Compared with the enhanced Mobile Broadband (eMBB) transmission, the URLLC transmission requires higher reliability and timeliness. For example, the URLLC transmission has very strict requirements on latency and requires to be completed within a certain time. However, the eMBB transmission does not have so strict requirements on latency and may be completed by means of multiple retransmissions.

Figure 1A:
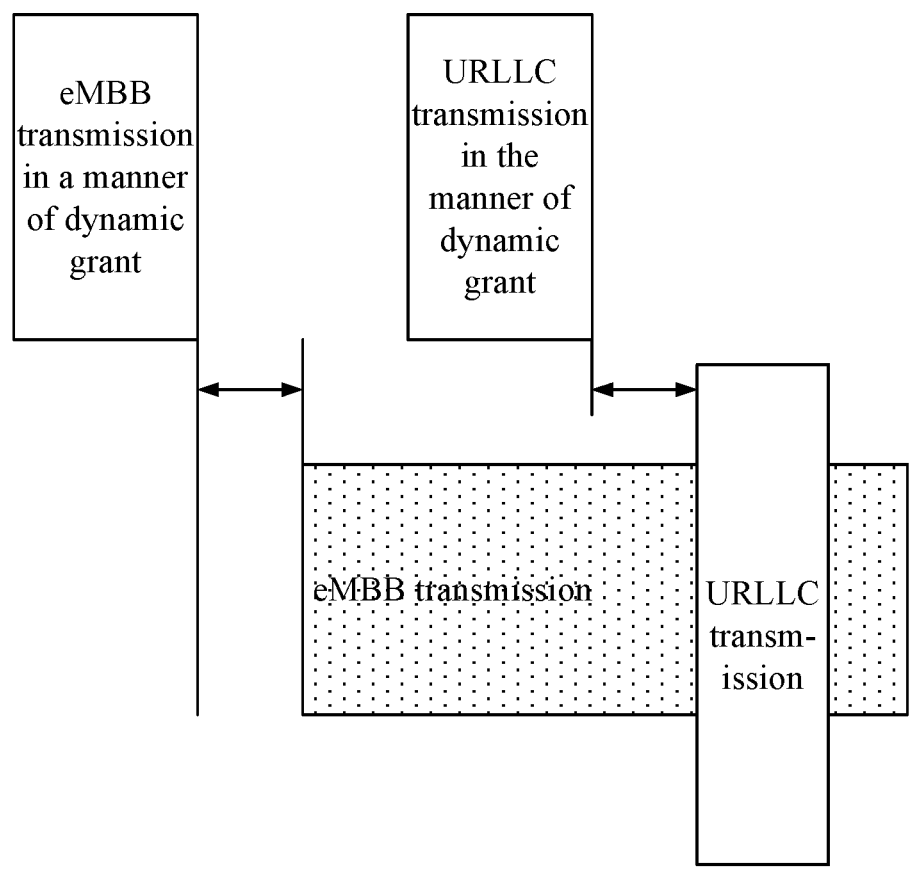
FIG. 1A is a schematic diagram of a Ultra-Reliable and Low Latency Communications (URLLC) transmission and an enhanced Mobile Broadband (eMBB) transmission overlapping in a time domain according to an embodiment.
Figure 1B:
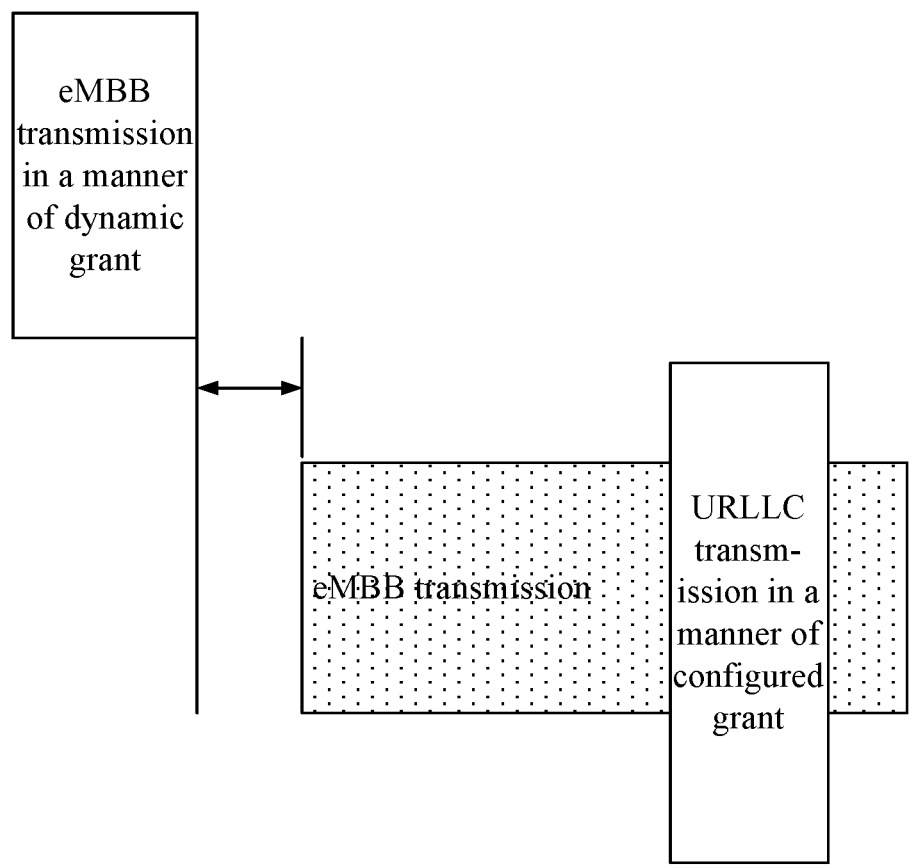
FIG. 1B is another schematic diagram of a URLLC transmission and an eMBB transmission overlapping in a time domain according to an embodiment.
Figure 1C:
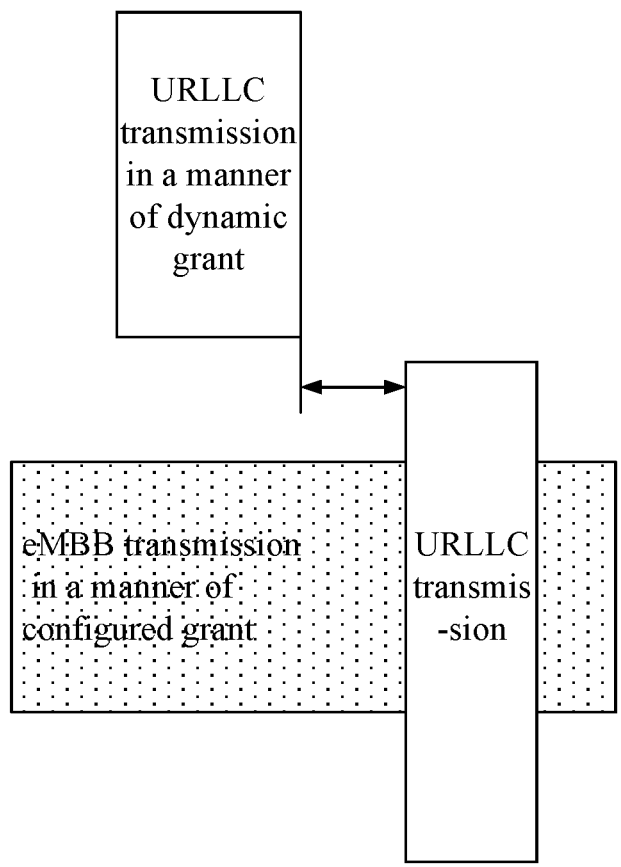
FIG. 1C is another schematic diagram of a URLLC transmission and an eMBB transmission overlapping in a time domain according to an embodiment.

In some scenarios, a UE may support both the eMBB transmission and the URLLC transmission. Having different requirements, the eMBB transmission and the URLLC transmission may have an overlap in a time domain. Exemplarily, when the eMBB of the UE requires to be scheduled, the base station sends the UE grant information of the eMBB (that is, downlink control information (DCI), where a traffic transmission scheduled through the grant information is referred to as a transmission in a manner of dynamic grant) and schedules the transmission of the eMBB transmission in slot n or a slot after slot n (for example, the transmission of the downlink transmission traffic is scheduled through a physical downlink shared channel (PDSCH) and the transmission of the uplink transmission traffic is scheduled through a physical uplink shared channel (PUSCH). After the grant information of the eMBB transmission is sent, if there is a sudden URLLC transmission demand, the base station sends the grant information of a URLLC transmission to the UE to schedule the URLLC transmission (a manner of configured grant may be adopted for this URLLC transmission (also referred to as a semi-statically scheduled traffic transmission). That is, this transmission is transmitted by using the relevant information configured before and no DCI is required to be scheduled, that is, no grant information is required, and this kind of grant manner is also referred to as configured grant). Due to the latency requirement of the URLLC transmission, the URLLC transmission and the previously scheduled eMBB transmission may have an overlap in a time domain. Exemplarily, FIG. 1A is a schematic diagram of a URLLC transmission and an eMBB transmission overlapping in a time domain according to an embodiment; FIG. 1B is another schematic diagram of a URLLC transmission and an eMBB transmission overlapping in a time domain according to an embodiment; FIG. 1C is another schematic diagram of a URLLC transmission and an eMBB transmission overlapping in a time domain according to an embodiment. As shown in FIG. 1A, the eMBB transmission is granted in a manner of dynamic grant, the URLLC transmission is granted in the manner of dynamic grant, and in this case, transmission of the eMBB transmission overlaps transmission of the URLLC transmission in a time domain. As shown in FIG. 1B, the eMBB transmission is granted in a manner of dynamic grant, the URLLC transmission is granted in a manner of configured grant, and in this case, transmission of the eMBB transmission overlaps transmission of the URLLC transmission in a time domain. As shown in FIG. 1C, the eMBB transmission is granted in a manner of configured grant, the URLLC transmission is granted in a manner of dynamic grant, and in this case, transmission of the eMBB transmission overlaps transmission of the URLLC transmission in a time domain. As can be seen from FIGS. 1A, 1B and 1C, the URLLC transmission and the eMBB transmission overlap in the time domain, which is due to the burstiness characteristic of the URLLC transmission. The scheduling requirement of the URLLC transmission is not found when the base station schedules the eMBB transmission, but the transmission requirement of the URLLC transmission is found after the eMBB transmission is scheduled. Since the URLLC transmission cannot be delayed, the URLLC transmission is scheduled immediately, which leads to the conflict between these two transmissions.

Some companies put forward that for traffic transmissions overlapping in a time domain, a corresponding discarding or punching transmission may be selected or performed in a physical layer according to a transmission priority. However, in the related art, the physical layer cannot identify which traffic type a transport block (TB) of a transmission corresponds to, so the physical layer cannot identify the priority of a traffic transmission.

The embodiments of the present application provide a method and apparatus for determining a transmission priority and a computer-readable storage medium so that a transmission priority can be determined to ensure the transmission having a higher priority in a case where preparation processes or transmission processes of at least two transmissions overlap. The method for determining a transmission priority provided in the embodiments of the present application is applicable not only to a transmission in a manner of dynamic grant but also to a transmission in a manner of configured grant, which is not limited in the embodiments of the present application.

Figure 2:
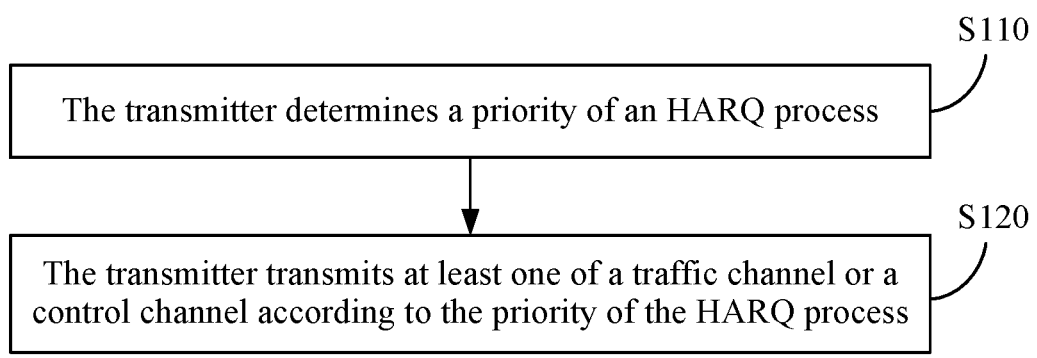
FIG. 2 is a flowchart of a method for determining a transmission priority according to an embodiment.

FIG. 2 is a flowchart of a method for determining a transmission priority according to an embodiment. As shown in FIG. 2, the method provided in the embodiment is applicable to a transmitter. The method includes the steps described below.

In S110, the transmitter determines a priority of an HARQ process.

The method in which the transmitter determines the priority of the HARQ process may include that a media access control (MAC) layer of the transmitter determines the priority of the HARQ process and notifies the priority of the HARQ process to a physical layer of the transmitter.

In an embodiment, the MAC layer of the transmitter determines, according to a highest priority of a logical channel (LCH), a priority of the MAC PDU; and then the MAC layer of the transmitter determines the priority of the HARQ process according to the priority of the MAC PDU, where the LCH is included in a media access control protocol data unit (MAC PDU) carried by the HARQ process.

The LCH is configured with a priority, so the MAC PDU can have a corresponding priority according to the highest priority of the LCH included in the MAC PDU. Exemplarily, the MAC layer of the transmitter may directly assign the highest priority of the LCH included in the MAC PDU to the MAC PDU; or the MAC layer of the transmitter processes the highest priority of the LCH included in the MAC PDU according to first convention mapping to obtain the priority of the MAC PDU.

After the MAC PDU is configured with a priority, the HARQ process carrying the MAC PDU can have a corresponding priority according to the priority of the MAC PDU. Exemplarily, the MAC layer of the transmitter may directly assign the priority of the MAC PDU to the HARQ process; or the MAC layer of the transmitter processes the priority of the MAC PDU according to second convention mapping to obtain the priority of the HARQ process.

The first convention mapping and the second convention mapping may be the same mapping or may be different mappings, which is not specifically limited in the embodiment of the present application.

In S120, the transmitter transmits at least one of a traffic channel or a control channel according to the priority of the HARQ process.

In the physical layer, when the transmitter transmits a TB (also referred to as a traffic transmission or traffic data, where the TB is the corresponding name of the MAC PDU of the MAC layer in the physical layer), an HARQ process is used for carrying a TB, and then the physical layer determines the priority of the TB carried by the HARQ process according to the priority of the HARQ process notified by the MAC layer.

In an embodiment, the step in which the transmitter transmits at least one of a traffic channel or a control channel according to the priority of the HARQ process may include any one of the three scenarios described below.

Scenario one: The transmitter determines, according to the priority of the HARQ process, a priority of a traffic transmission in the traffic channel carried by the HARQ process and determines transmission of the traffic transmission by using the priority of the traffic transmission.

In an embodiment, the step in which the transmitter determines, according to the priority of the HARQ process, the priority of the traffic transmission in the traffic channel carried by the HARQ process may include that the transmitter directly assigns the priority of the HARQ process to the traffic transmission in the traffic channel carried by the HARQ process or that the transmitter processes, according to third convention mapping, the priority of the HARQ process to obtain the priority of the traffic transmission in the traffic channel carried by the HARQ process.

Scenario two: The transmitter determines, according to the priority of the HARQ process, a priority of a Hybrid Automatic Repeat reQuest-Acknowledgement (HARQ-ACK) codebook in a control channel and determines transmission of the HARQ-ACK codebook by using the priority of the HARQ-ACK codebook, where the control channel corresponds to a traffic transmission in the traffic channel carried by the HARQ process.

In an embodiment, the step in which the transmitter determines, according to the priority of the HARQ process, the priority of the HARQ-ACK codebook in the control channel corresponding to the traffic transmission in the traffic channel carried by the HARQ process may include that the transmitter directly assigns the priority of the HARQ process to the HARQ-ACK codebook in the control channel or that the transmitter processes, according to third convention mapping, the priority of the HARQ process to obtain the priority of the HARQ-ACK codebook in the control channel, where the control channel corresponds to the traffic transmission in the traffic channel carried by the HARQ process is obtained.

Scenario three: The transmitter determines, according to the priority of the HARQ process, a priority of a traffic transmission in the traffic channel carried by the HARQ process and a priority of an HARQ-ACK codebook in a control channel corresponding to the traffic transmission in the traffic channel carried by the HARQ process and determines transmission of the traffic transmission and transmission of the HARQ-ACK codebook by using the priority of the traffic transmission and the priority of the HARQ-ACK codebook.

The third convention mapping, the first convention mapping, and the second convention mapping may be the same mapping or may be different mappings, which is not specifically limited in the embodiment of the present application.

Thus, in a case where preparation processes or transmission processes of at least two transmissions overlap, the transmitter can select the transmission having a higher priority to be processed so as to ensure the transmission having the higher priority.

In an embodiment, for at least two traffic transmissions, in a case where a first traffic transmission and a second traffic transmission have a processing conflict or have an overlap in a time domain: when the transmitter determines that the first traffic transmission has priority over the second traffic transmission according to a priority of an HARQ process carrying the first traffic transmission and a priority of an HARQ process carrying the second traffic transmission, the transmitter discards the second traffic transmission, or cancels transmission of the second traffic transmission, or discards part of the second traffic transmission, or transmits part of the second traffic transmission.

In the embodiment, the first traffic transmission and the second traffic transmission having the processing conflict in the time domain refers to the following: one UE is required to process the first traffic transmission and the second traffic transmission at the same time, but the UE has a poor capability and can actually process merely one traffic transmission; or one UE is required to prepare the first traffic transmission and the second traffic transmission at the same time, but the UE has a poor capability and can actually prepare merely one traffic transmission.

In an embodiment, for at least two traffic transmissions, in a case where a first traffic transmission and a second traffic transmission overlap in a time domain and an HARQ process carrying the first traffic transmission has a priority equal to a priority of an HARQ process carrying the second traffic transmission: the first traffic transmission is granted in a manner of dynamic grant, the second traffic transmission is granted in the manner of dynamic grant, and the first traffic transmission has priority over the second traffic transmission, where the dynamic grant of the first traffic transmission is later than the dynamic grant of the second traffic transmission; or the first traffic transmission is granted in a manner of dynamic grant, the second traffic transmission is granted in a manner of configured grant, and the first traffic transmission has priority over the second traffic transmission; or the first traffic transmission is granted in a manner of configured grant, the second traffic transmission is granted in the manner of configured grant, and the first traffic transmission has priority over the second traffic transmission, where transmission of the first traffic transmission is earlier than transmission of the second traffic transmission.

In an embodiment, HARQ-ACK corresponding to traffic transmissions having a same HARQ process priority forms an HARQ-ACK codebook; or HARQ-ACK corresponding to traffic transmissions having a same priority forms an HARQ-ACK codebook, where a priority of a traffic transmission is determined according to a priority of an HARQ process carrying the traffic transmission; or HARQ-ACK corresponding to traffic transmissions carried by HARQ processes having a priority difference not exceeding a preset level forms an HARQ-ACK codebook; or HARQ-ACK corresponding to traffic transmissions having a priority difference not exceeding a preset level forms an HARQ-ACK codebook, where a priority of a traffic transmission is determined according to a priority of an HARQ process carrying the traffic transmission.

In an embodiment, for at least two traffic transmissions, in a case where a physical uplink control channel (PUCCH) of an HARQ-ACK codebook corresponding to a first traffic transmission and a PUCCH of an HARQ-ACK codebook corresponding to a second traffic transmission overlap in a time domain, and the HARQ-ACK codebook corresponding to the first traffic transmission and the HARQ-ACK codebook corresponding to the second traffic transmission are allowed to be multiplexed: the HARQ-ACK codebook corresponding to the first traffic transmission is placed before the HARQ-ACK codebook corresponding to the second traffic transmission, where the first traffic transmission has priority over the second traffic transmission; or an HARQ process carrying the first traffic transmission has priority over an HARQ process carrying the second traffic transmission.

In an embodiment, for at least two traffic transmissions, in a case where a PUCCH of an HARQ-ACK codebook corresponding to a first traffic transmission and a PUCCH of an HARQ-ACK codebook corresponding to a second traffic transmission overlap in a time domain, and an HARQ process carrying the first traffic transmission has priority over an HARQ process carrying the second traffic transmission, the transmitter cancels a PUCCH transmission of the HARQ-ACK codebook corresponding to the second traffic transmission.

Some example implementations are listed below to illustrate the method for determining a transmission priority provided in the present application.

In a first example implementation, the overall idea of the method for determining a transmission priority provided by the present application may be summarized as follows: the MAC layer of the transmitter determines the priority of an HARQ process and notifies the priority of the HARQ process to a physical layer. The physical layer determines, according to the priority of the HARQ process, the priority of a traffic transmission carried by the HARQ process.

The step in which the MAC layer determines the priority of the HARQ process is as follows: when a MAC PDU is generated in the MAC layer, the MAC layer determines the priority of the MAC PDU according to the highest priority of an LCH included in the MAC PDU and determines, according to the priority of the MAC PDU, the priority of the HARQ process carrying the MAC PDU. For example, the LCH is configured with a priority, so the MAC PDU can have a corresponding priority according to the highest priority of the LCH included in the MAC PDU (for example, the highest priority of the LCH included in the MAC PDU is directly assigned to the MAC PDU, or the highest priority of the LCH is processed according to a convention mapping so that the priority of the MAC PDU is obtained). The priority of the MAC PDU is directly assigned to the HARQ process carrying the MAC PDU, or the priority of the MAC PDU is processed according to a convention mapping so that the priority of the HARQ process carrying the MAC PDU is obtained.

In the physical layer, when the transmitter transmits a TB (also referred to as a traffic transmission or traffic data, where the TB is the corresponding name of the MAC PDU of the MAC layer in the physical layer), an HARQ process is used for carrying a TB, and then the physical layer determines the priority of the TB carried by the HARQ process according to the priority of the HARQ process notified by the MAC layer. For example, the priority of the HARQ process is directly used as the priority of the TB carried by the HARQ process, or the priority of the TB is obtained after the convention mapping is performed. Here, since the TBs (referred to as MAC PDUs in the MAC layer) carried by HARQs in the physical layer are determined by the MAC layer and notified to the physical layer, the MAC layer knows a correspondence between an HARQ process and the TB carried by the HARQ process. The physical layer determines, according to the priority of the HARQ process, the priority of the TB carried by the HARQ process, involving the initial transmission and retransmission of the TB. When the TB is successfully transmitted, the priority of the HARQ process is invalidated. When a new TB is transmitted in the HARQ process, the MAC layer assigns a priority to the HARQ process again according to the highest priority of the LCH in the newly carried MAC PDU. When two HARQ processes have the same priority, priorities of TBs carried by the two HARQ processes are required to be determined if the TBs carried by the two HARQ processes overlap in a time domain during transmission, and a retransmitted TB may be considered to have a higher priority. If the TBs are both initially transmitted, it is considered that the priority of the TB scheduled later is high; if the TBs are both retransmitted, the TB retransmitted more times has a higher priority. Alternatively, the transmitter is required to avoid the time domain overlap of multiple transmissions having the same HARQ process priority. For example, when the transmitter plans a transmission, the transmitter delays the planned transmission traffic if finding that such transmission and another transmission having the same HARQ process priority will overlap in the time domain.

In the embodiment, when a TB is transmitted in the physical layer, an HARQ process is always used to bind with the TB so that the TB is subjected to HARQ combination according to the HARQ process during retransmission, that is, the retransmitted TB and the initially transmitted TB use the same HARQ process, and the indication in DCI is retransmission so that a receiving end performs the HARQ combination.

After the physical layer obtains the priority of the HARQ process, when data transmission is performed in the physical layer, the priorities of multiple data transmission (channels) can be determined according to the priorities of the HARQ processes of these data transmissions if multiple data transmission channels overlap in a time domain, thereby ensuring the data transmission having a higher priority. The data transmission having a lower priority is discarded or cancelled or partially transmitted. In this manner, the physical layer can use the priority of the HARQ process to determine the priority of a data transmission carried by the HARQ process.

In an embodiment, the problem solved by the method for determining a transmission priority provided in the embodiment of the present application may also be solved by another idea described below.

The MAC layer determines a priority for a MAC PDU and notifies the physical layer of the priority of the MAC PDU. The physical layer introduces a priority indication field into DCI so as to indicate the priority of the traffic transmission (that is, the transmission of a MAC PDU in the physical layer) corresponding to the DCI. According to the priority of the MAC PDU notified by the MAC layer, the value of the priority indication field is determined so as to describe the priority of the traffic transmission corresponding to the DCI.

Here, the MAC layer determines the priority of a MAC PDU still in the manner described above and notifies the physical layer of the determined priority. The physical layer converts the priority information into the priority of the traffic transmission when the MAC PDU is transmitted in the physical layer, and notifies the UE of the priority of the traffic transmission in the DCI scheduling the traffic transmission. In other embodiments of the present application, the priority of the traffic transmission indicated in the DCI may also be used for corresponding processing, such as replacing the priority of the HARQ process in other embodiments.

In an embodiment, the process described below may also be included in the embodiment of the present application.

The transmitter establishes a mapping relationship between the HARQ process and the priority of a logical channel (or MAC PDU) in the MAC layer so that the HARQ process can reflect the priority of the MAC PDU carried by the HARQ process. The transmitter stores the priority of the logical channel (or MAC PDU) associated with the HARQ process (where the HARQ process is used for carrying data in the logical channel (or MAC PDU)) in the HARQ process processing of the MAC layer.

The transmitter notifies the priority of the HARQ process to the physical layer in the HARQ process processing of the MAC layer, or when the transmitter transmits a transport block (TB), the transmitter notifies the priority of the HARQ process to the physical layer in the HARQ process processing of the MAC layer. The HARQ process carries the TB. In this manner, the physical layer knows the priority of the HARQ process which can be used in a traffic transmission or control information transmission in the physical layer.

The preceding manner may also be used for a retransmitted TB.

For the retransmitted TB, the HARQ process of the retransmitted TB has a priority which is the same as the HARQ process priority when the TB is initially transmitted. Alternatively, for the retransmitted TB, the HARQ process priority of the retransmitted TB is set higher than the HARQ process priority of the initially transmitted TB considering that the TB is retransmitted. Alternatively, in the case of two HARQ processes having the same priority, if the TB carried by one HARQ process is retransmitted and the TB carried by the other HARQ process is initially transmitted, the HARQ process carrying the retransmitted TB has a higher priority.

A second example implementation describes how to solve a problem by using an HARQ process priority for a UE when channels of multiple traffic transmissions overlap in a time domain.

The case in which the channels of multiple traffic transmissions overlap in the time domain may be, but is not limited to, the scenarios described below.

Scenario one: A downlink traffic transmission in a manner of dynamic grant and a downlink traffic transmission in the manner of dynamic grant overlap in a time domain (involving a partial time domain overlap or an entire time domain overlap, the same below).

Scenario two: An uplink traffic transmission in a manner of configured grant and an uplink traffic transmission in a manner of dynamic grant overlap in a time domain.

Scenario three: An uplink traffic transmission in a manner of dynamic grant and an uplink traffic transmission in the manner of dynamic grant overlap in a time domain.

Scenario four: An uplink traffic transmission in a manner of configured grant and an uplink traffic transmission in the manner of configured grant overlap in a time domain.

In an embodiment, the uplink traffic transmission may also be replaced with an uplink control channel transmission. In this manner, the scenarios described below are also included.

Scenario five: The uplink traffic transmission in a manner of dynamic grant and the uplink control channel transmission overlap in a time domain.

Scenario six: The uplink traffic transmission in a manner of configured grant and the uplink control channel transmission overlap in a time domain.

Scenario seven: An uplink control channel transmission and an uplink control channel transmission overlap in a time domain.

The scenario described below may also be included.

Scenario eight: A downlink traffic transmission in a manner of configured grant and a downlink traffic transmission in the manner of configured grant overlap in a time domain.

For the preceding scenarios 1 to 4 and 8, when traffic transmissions overlap in the time domain, the priority of the HARQ process carrying the traffic can be directly used as the priority of the transmission traffic so as to determine the priority of the traffic transmission. Then, a traffic transmission having a higher priority is normally transmitted, and a traffic transmission having a lower priority is entirely cancelled/discarded, or a traffic transmission having a lower priority is partially cancelled/discarded (that is, part of the traffic transmission having a lower priority is punched, for example, the traffic transmission having a lower priority at the time domain overlap position is punched so that the traffic transmission having a lower priority can merely be partially transmitted).

For scenarios five and six, the uplink control channel transmission and the uplink traffic transmission overlap in the time domain; in this case, the priority of the uplink control channel transmission is determined by the priority of the HARQ process of the traffic transmission corresponding to the uplink control channel. For example, if an uplink control channel transmission carries HARQ-ACK of a transmission of traffic A, the priority of the uplink control channel transmission is determined by the priority of the HARQ process of the transmission of traffic A. Thus, in scenarios five and six, the priorities of the two transmissions can still be determined by using the priority of the HARQ process. Similarly, the following method can be used for transmission: a transmission having a higher priority is normally transmitted, and a transmission having a lower priority is entirely cancelled/discarded, or a transmission having a lower priority is partially cancelled/discarded (that is, part of the transmission having a lower priority is punched, for example, the transmission having a lower priority at the time domain overlap position is punched so that the traffic transmission having a lower priority can merely be partially transmitted).

In an embodiment, if the uplink control channel transmission has a higher priority and the uplink traffic transmission has a lower priority after the priorities of the two transmissions are distinguished, uplink control information in the uplink control channel transmission can also be carried through the uplink traffic transmission. In this case, agreed rule A is adopted, UCI is sent by being carried in the uplink traffic transmission (38.212vf40 in the New Radio Access Technology (NR) has a corresponding mechanism carrying mechanism, but such mechanism is suitable for the case where priorities of the two transmissions are the same, and rule A here is more suitable for the case where the uplink control channel transmission has priority over the uplink traffic transmission), and transmission of the uplink control channel transmission is cancelled. If the uplink traffic transmission has priority over the uplink control channel transmission, the transmission having a lower priority is discarded; agreed rule B may also be adopted, and UCI in the uplink control channel transmission is sent by being carried in the uplink traffic transmission. Relative to a mechanism in the related art, rule A additionally includes the following: when a resource used in the uplink traffic transmission is computed for the UCI, the actually computed UCI resource is used as the resource for the final transmission of the UCI if the upper limit of the maximum resource used in the uplink traffic transmission configured by the base station is exceeded (and not all the uplink traffic transmission resources are used). Relative to a mechanism in the related art, rule B additionally includes the following: a value of repetition factor beta of UCI in the uplink traffic transmission is set to be less than 1 or even equal to 0.

For scenario seven, the uplink control channel transmission and the uplink control channel transmission overlap in the time domain, and the priority of the uplink control channel is still determined in the preceding manner, that is, according to the priority of the HARQ process of the traffic transmission corresponding to the uplink control channel. The uplink control channel having a lower priority is still processed in such a manner that transmission of the uplink control channel transmission having the lower priority is entirely cancelled or partially cancelled. Alternatively, agreed rule C is adopted; the UCI in two uplink control channels is multiplexed and transmitted in a new uplink control channel, and the original uplink control channels are discarded (if the new uplink control channel is one of the original uplink control channels, the remaining original uplink control channel is discarded). Rule C includes the following: during multiplexing in one PUCCH, the code rate after the multiplexing is not higher than the code rate of the PUCCH having a higher priority among the original plurality of PUCCHs; the end position of the PUCCH after the multiplexing is not later than the end position of the PUCCH having a higher priority among the original plurality of PUCCHs.

In a third example implementation, for two transmission channels overlapping in the time domain, the execution is performed according to the preceding embodiment if the transmission channel having a higher priority among a plurality of transmission channels can be determined directly in a manner of determining the priority of a transmission by using the priority of an HARQ process in the preceding embodiment.

If the priorities of two transmissions are the same (including that the priorities are determined by using priorities of the HARQ processes in the preceding embodiment and that the priorities are determined in other manners such as the addition of a bit field in the DCI to indicate the priority of a corresponding transmission channel in discussion), processing is performed in the manner described in this example embodiment. See scenarios one to four in the second example implementation.

For scenarios one and three, the base station and the UE agree that: for one UE, when two dynamically granted traffic transmissions overlap in the time domain and the two traffic transmissions have the same priority, the later traffic transmission of dynamically grant information is regarded as having a higher priority and processing is performed according to the traffic transmission having a higher priority in the preceding embodiment.

For scenario two, the base station and the UE agree that: for one UE, when the uplink traffic transmission in a manner of configured grant and the uplink traffic transmission in a manner of dynamic grant overlap in the time domain and the two traffic transmissions have the same priority, the uplink traffic transmission in the manner of dynamic grant is regarded as having a higher priority, and processing is performed according to the traffic transmission having the higher priority in the preceding embodiment.

For scenario four, the base station and the UE agree that: for one UE, when the uplink traffic transmission in a manner of configured grant and the uplink traffic transmission in the manner of configured grant overlap in the time domain and the two traffic transmissions have the same priority, the traffic transmission that is transmitted first is regarded as having a higher priority, and processing is performed according to the traffic transmission having the higher priority in the preceding embodiment.

In a fourth example implementation, another usage of the priority of the HARQ process is provided mainly for distinguishing different traffic transmission types, thereby facilitating the formation of the HARQ-ACK codebook.

For example, the usage is provided for distinguishing a URLLC traffic transmission and an eMBB traffic transmission. When the HARQ-ACK codebook is formed, the HARQ-ACK corresponding to the same type of traffic transmissions is allowed to form an HARQ-ACK codebook; or for traffic transmissions having different priorities, if the priority difference does not exceed P levels (P is a given value), the HARQ-ACK corresponding to these traffic transmissions is allowed to form an HARQ-ACK codebook since the traffic transmissions having close traffic transmission priorities are also close in terms of performance requirements.

Exemplarily, two traffic transmission types of the URLLC traffic and the eMBB traffic are used as an example, the priorities of the HARQ processes may also be correspondingly set to two types corresponding to the URLLC traffic and the eMBB traffic respectively, and the priority of the HARQ process is acquired in the same manner as described in the preceding embodiment. The traffic transmission requirement is always from the MAC layer to the physical layer. Therefore, when the MAC layer prepares the MAC PDU, the priority of the MAC PDU is determined according to the priority of the LCH included in the MAC PDU, the HARQ process carrying the MAC PDU is correspondingly determined, and the priority of the HARQ process carrying the MAC PDU is determined according to the priority of the MAC PDU. For the convenience of marking, the HARQ processes may be set to two levels since merely two types of traffic are required to be distinguished. In an embodiment, the priority of the preceding embodiment may also be used again. In this case, merely the priority corresponding to URLLC traffic and the priority corresponding to eMBB traffic are required to be defined in advance, that is, a corresponding mapping table is established between the priority of the HARQ process (that is, the priority of the MAC PDU) and the traffic type. If more traffic types are required to be distinguished, the above example can be extended, and the basic principle is the same.

In the physical layer, the UE determines whether the HARQ-ACK corresponding to traffic transmissions belongs to an HARQ-ACK codebook according to the priorities of the HARQ processes corresponding to the traffic transmissions. HARQ-ACK corresponding to traffic transmissions having a same HARQ process priority is allowed to form an HARQ-ACK codebook. If the PUCCHs of the HARQ-ACK codebooks corresponding to two traffic transmissions overlap, and the HARQ-ACK codebooks of the traffic transmissions having different HARQ process priorities are allowed to be multiplexed together and transmitted through one PUCCH, the HARQ-ACK codebook corresponding to the higher priority is placed before the HARQ-ACK codebook corresponding to the lower priority during multiplexing; rule C set in scenario seven in the second example implementation may also be adopted. The HARQ-ACK codebooks corresponding to the two traffic transmissions are multiplexed together only when rule C is satisfied. In a case where rule C is not satisfied, no multiplexing is performed, and the HARQ-ACK codebook corresponding to the lower priority is discarded.

In an embodiment, the base station and the UE agree that HARQ-ACK of traffic transmissions having close traffic transmission priorities may form an HARQ-ACK codebook. For example, the traffic transmission priorities corresponding to traffic transmissions whose HARQ-ACK is allowed to form an HARQ-ACK codebook are specified in a predefined manner. The base station and the UE always form an HARQ-ACK codebook for HARQ-ACK corresponding to a plurality of traffic transmissions having different priorities according to a predetermined rule (the HARQ-ACK of the traffic transmissions having these priorities is allowed to form an HARQ-ACK codebook according to the predetermined rule). This manner can solve the problem of too many independent HARQ-ACK codebooks caused by too many traffic transmission priorities. The priority of a traffic transmission may be determined by the priority of the HARQ process carrying the traffic transmission, or is known in other manners, or is the priority of the HARQ process carrying the traffic transmission.

In a fifth example implementation, another usage of the priority of the HARQ process is provided.

In the related art, HARQ-ACK is allowed to be multiplexed in a PUSCH for transmission, that is, for one UE, once a PUCCH resource carrying the HARQ-ACK overlaps a PUSCH resource for use, or when no PUCCH resource is configured, the HARQ-ACK is multiplexed in the PUSCH for transmission. At present, a URLLC traffic transmission is introduced. The URLLC traffic transmission requires high reliability. When HARQ-ACK of an eMBB traffic transmission is to be multiplexed in the URLLC traffic transmission, the reliability of the URLLC traffic transmission may decrease, so some methods are required to be taken to protect the URLLC traffic transmission at this time.

The manner described below is provided for the preceding problem.

For a UE, when the HARQ-ACK codebook is required to be multiplexed and transmitted in the PUSCH, the UE performs processing as described below.

The priority of the HARQ-ACK codebook is determined by the priority of the HARQ process where the PDSCH corresponding to the HARQ-ACK codebook is located. The priority of the PUSCH is determined by the priority of the HARQ process where the PUSCH is located.

The UE determines the sending of the HARQ-ACK codebook and the PUSCH according to the comparison of the priority of the HARQ-ACK codebook with the priority of the PUSCH as follows: when the PUSCH has priority over the HARQ-ACK codebook, the HARQ-ACK codebook is forbidden to be multiplexed in the PUSCH (the beta value in the uplink grant corresponding to the PUSCH is correspondingly set to be 0 by the base station in this case). When the HARQ-ACK codebook has priority over the PUSCH, the HARQ-ACK codebook is multiplexed in the PUSCH for transmission.

For a base station, when the HARQ-ACK codebook is multiplexed in the PUSCH for transmission, the base station performs processing as described below.

The priority of the HARQ-ACK codebook is configured, that is, the priority of the HARQ process where the PDSCH corresponding to the HARQ-ACK codebook is located is configured. The priority of the PUSCH is configured, that is, the priority of the HARQ process where the PUSCH is located is configured. The base station receives the HARQ-ACK codebook and the PUSCH according to the comparison of the priority of the HARQ-ACK codebook with the priority of the PUSCH as follows: when the PUSCH is configured to have priority over the HARQ-ACK codebook, the base station determines that the HARQ-ACK codebook is discarded and that the PUSCH is transmitted (that is, the base station considers that the UE does not multiplex the HARQ-ACK codebook in the PUSCH and merely sends the PUSCH). When the HARQ-ACK codebook has priority over the PUSCH, the base station determines that the HARQ-ACK codebook is multiplexed in the PUSCH for transmission.

In a sixth example implementation, a following problem is solved: how the UE generates HARQ-ACK information for a group of PDSCHs overlapping in the time domain when the UE can support simultaneous reception and processing of a plurality of PDSCHs overlapping in the time domain and the UE is configured with a semi-static HARQ-ACK codebook.

The method includes the following: It is assumed that for a UE, candidate PDSCH resources configured by the base station for the UE exist in M candidate PDSCHs overlapping in the time domain in one slot or subslot. It is assumed that the UE has the capability of simultaneously receiving and processing N PDSCHs overlapping in the time domain. When the UE is configured with a semi-static HARQ-ACK codebook, the UE and the base station determine HARQ-ACK information (or HARQ-ACK codebook information) corresponding to the M candidate PDSCHs overlapping in the time domain according to the rule described below. The rule is as described below.

If M≤N, the UE and the base station determine to form M pieces of HARQ-ACK information; if M>N, the UE and the base station determine to form N pieces of HARQ-ACK information; in an embodiment, the PDSCHs corresponding to the N pieces of HARQ-ACK information in this case includes the first N PDSCHs having higher priorities among the M PDSCHs overlapping in the time domain. For candidate PDSCHs having the same priority, PDSCHs having earlier (or later) starting symbol positions are considered to have higher priorities.

The preceding method can be summarized as follows: the base station and the UE agree that if the UE is capable of simultaneously processing N PDSCHs overlapping in the time domain, the UE determines min (N, M) pieces of HARQ-ACK information or min (N, M) HARQ-ACK codebooks for a group of M PDSCHs overlapping in the time domain when a semi-static HARQ-ACK codebook is used. Here, for the semi-static HARQ-ACK codebook, the determination of the number of pieces of HARQ-ACK information for a group of M PDSCHs overlapping in the time domain has nothing to do with the number of PDSCHs actually scheduled by the base station for the UE.

Figure 3:
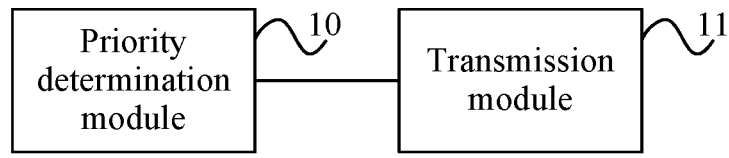
FIG. 3 is a structure diagram of an apparatus for determining a transmission priority according to an embodiment.

FIG. 3 is a structure diagram of an apparatus for determining a transmission priority according to an embodiment. The apparatus for determining a transmission priority may be configured in a transmitter. As shown in FIG. 3, the apparatus includes a priority determination module 10 and a transmission module 11. The priority determination module 10 is configured to determine a priority of a Hybrid Automatic Repeat reQuest (HARQ) process. The transmission module 11 is configured to transmit at least one of a traffic channel or a control channel according to the priority of the HARQ process.

The apparatus for determining a transmission priority provided in the embodiment is configured to implement the method for determining a transmission priority of the embodiment shown in FIG. 2. The implementation principle and technical effect of the apparatus for determining a transmission priority provided in the embodiment are similar to those of the method. Details are not repeated here.

In an embodiment, the priority determination module 10 is further configured to determine, according to the priority of the HARQ process, a priority of a traffic transmission in the traffic channel carried by the HARQ process; and the transmission module 11 is configured to determine transmission of the traffic transmission by using the priority of the traffic transmission. Alternatively, the priority determination module 10 is further configured to determine, according to the priority of the HARQ process, a priority of a Hybrid Automatic Repeat reQuest-Acknowledgement (HARQ-ACK) codebook in a control channel corresponding to a traffic transmission in the traffic channel carried by the HARQ process; and the transmission module 11 is configured to determine transmission of the HARQ-ACK codebook by using the priority of the HARQ-ACK codebook. Alternatively, the priority determination module 10 is further configured to determine, according to the priority of the HARQ process, a priority of a traffic transmission in the traffic channel carried by the HARQ process and a priority of an HARQ-ACK codebook in a control channel corresponding to the traffic transmission in the traffic channel carried by the HARQ process; and the transmission module 11 is configured to determine transmission of the traffic transmission and transmission of the HARQ-ACK codebook by using the priority of the traffic transmission and the priority of the HARQ-ACK codebook.

In an embodiment, the priority determination module 10 is configured to determine the priority of the HARQ process through a media access control (MAC) layer and notify the priority of the HARQ process to a physical layer of the transmitter.

In an embodiment, the priority determination module 10 is configured to determine the priority of the HARQ process through the MAC layer in a following manner: the MAC layer determines, according to a highest priority of a logical channel (LCH) included in a media access control protocol data unit (MAC PDU) carried by the HARQ process, a priority of the MAC PDU; and the MAC layer determines the priority of the HARQ process according to the priority of the MAC PDU.

In an embodiment, the priority determination module 10 is configured to determine, according to the highest priority of the LCH included in the MAC PDU carried by the HARQ process, the priority of the MAC PDU in a following manner: the MAC layer assigns the highest priority of the LCH included in the MAC PDU to the MAC PDU; or the MAC layer processes, according to first convention mapping, the highest priority of the LCH included in the MAC PDU so that the priority of the MAC PDU is obtained.

In an embodiment, the priority determination module 10 is configured to determine the priority of the HARQ process according to the priority of the MAC PDU through the MAC layer in a following manner: the MAC layer assigns the priority of the MAC PDU to the HARQ process; or the MAC layer processes, according to second convention mapping, the priority of the MAC PDU so that the priority of the HARQ process is obtained.

In an embodiment, the priority determination module 10 is configured to determine, according to the priority of the HARQ process, the priority of the traffic transmission in the traffic channel carried by the HARQ process in a following manner: assigning the priority of the HARQ process to the traffic transmission in the traffic channel carried by the HARQ process; or processing, according to third convention mapping, the priority of the HARQ process so that the priority of the traffic transmission in the traffic channel carried by the HARQ process is obtained.

In an embodiment, the priority determination module 10 is configured to determine, according to the priority of the HARQ process, the priority of the HARQ-ACK codebook in the control channel corresponding to the traffic transmission in the traffic channel carried by the HARQ process in a following manner: assigning the priority of the HARQ process to the HARQ-ACK codebook in the control channel corresponding to the traffic transmission in the traffic channel carried by the HARQ process; or processing, according to third convention mapping, the priority of the HARQ process so that the priority of the HARQ-ACK codebook in the control channel corresponding to the traffic transmission in the traffic channel carried by the HARQ process is obtained.

Figure 4:
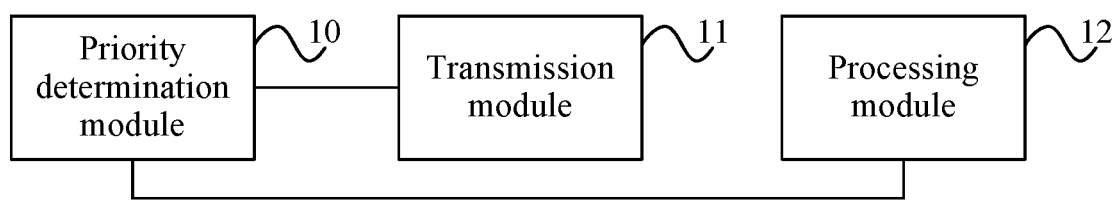
FIG. 4 is a structure diagram of another apparatus for determining a transmission priority according to an embodiment.

In an embodiment, in conjunction with FIG. 3, FIG. 4 is a structure diagram of another apparatus for determining a transmission priority according to an embodiment. As shown in FIG. 4, the apparatus further includes a processing module 12.

For at least two traffic transmissions, in a case where a first traffic transmission and a second traffic transmission have a processing conflict or overlap in a time domain: the processing module 12 is configured to discard the second traffic transmission, or cancel transmission of the second traffic transmission, or discard part of the second traffic transmission, or transmit part of the second traffic transmission. The priority determination module is further configured to determine that the first traffic transmission has priority over the second traffic transmission according to a priority of an HARQ process carrying the first traffic transmission and a priority of an HARQ process carrying the second traffic transmission.

In an embodiment, for at least two traffic transmissions, in a case where a first traffic transmission and a second traffic transmission overlap in a time domain and an HARQ process carrying the first traffic transmission has a priority equal to a priority of an HARQ process carrying the second traffic transmission: the first traffic transmission is granted in a manner of dynamic grant, the second traffic transmission is granted in the manner of dynamic grant, and the first traffic transmission has priority over the second traffic transmission, where the dynamic grant of the first traffic transmission is later than the dynamic grant of the second traffic transmission; or the first traffic transmission is granted in a manner of dynamic grant, the second traffic transmission is granted in a manner of configured grant, and the first traffic transmission has priority over the second traffic transmission; or the first traffic transmission is granted in a manner of configured grant, the second traffic transmission is granted in the manner of configured grant, and the first traffic transmission has priority over the second traffic transmission, where transmission of the first traffic transmission is earlier than transmission of the second traffic transmission.

In an embodiment, HARQ-ACK corresponding to traffic transmissions having a same HARQ process priority forms an HARQ-ACK codebook; or HARQ-ACK corresponding to traffic transmissions having a same priority forms an HARQ-ACK codebook, where a priority of a traffic transmission is determined according to a priority of an HARQ process carrying the traffic transmission; or HARQ-ACK corresponding to traffic transmissions carried by HARQ processes having a priority difference not exceeding a preset level forms an HARQ-ACK codebook; or HARQ-ACK corresponding to traffic transmissions having a priority difference not exceeding a preset level forms an HARQ-ACK codebook, and a priority of a traffic transmission is determined according to a priority of an HARQ process carrying the traffic transmission.

In an embodiment, for at least two traffic transmissions, in a case where a physical uplink control channel (PUCCH) of an HARQ-ACK codebook corresponding to a first traffic transmission and a PUCCH of an HARQ-ACK codebook corresponding to a second traffic transmission overlap in a time domain, and the HARQ-ACK codebook corresponding to the first traffic transmission and the HARQ-ACK codebook corresponding to the second traffic transmission are allowed to be multiplexed: the HARQ-ACK codebook corresponding to the first traffic transmission is placed before the HARQ-ACK codebook corresponding to the second traffic transmission, where the first traffic transmission has priority over the second traffic transmission; or an HARQ process carrying the first traffic transmission has priority over an HARQ process carrying the second traffic transmission.

In an embodiment, referring to FIG. 4, for at least two traffic transmissions, in a case where a PUCCH of an HARQ-ACK codebook corresponding to a first traffic transmission and a PUCCH of an HARQ-ACK codebook corresponding to a second traffic transmission overlap in a time domain, and an HARQ process carrying the first traffic transmission has priority over an HARQ process carrying the second traffic transmission, the processing module 12 is configured to cancel a PUCCH transmission of the HARQ-ACK codebook corresponding to the second traffic transmission.

Figure 5:
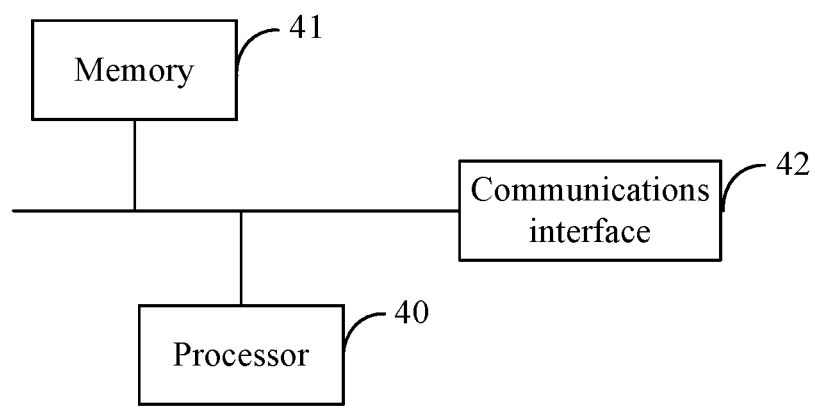
FIG. 5 is a structure diagram of a base station according to an embodiment.

FIG. 5 is a structure diagram of a base station according to an embodiment. As shown in FIG. 5, the base station includes a processor 40, a memory 41, and a communications interface 42. One or more processors 40 may be provided in the base station, and one processor 40 is used as an example in FIG. 5. The processor 40, the memory 41, and the communications interface 42 in the base station may be connected through a bus or in other manners. In FIG. 5, the connection through a bus is used as an example. The bus represents one or more of several types of bus structures, including a memory bus or a memory controller, a peripheral bus, an accelerated graphics port, a processor, or a local bus using any bus structure among multiple bus structures.

As a computer-readable storage medium, the memory 41 may be configured to store software programs, computer executable programs and modules, such as program instructions/modules corresponding to the method for determining a transmission priority in the embodiments of the present application. The processor 40 runs the software programs, instructions and modules stored in the memory 41 to execute at least one of functional applications and data processing of the base station, that is, to implement the preceding method for determining a transmission priority.

The memory 41 may mainly include a program storage area and a data storage area. The program storage area may store an operating system and an application program required for implementing at least one function while the data storage area may store data created depending on use of a UE. In addition, the memory 41 may include a high-speed random-access memory and may also include a non-volatile memory such as at least one magnetic disk memory, flash memory or other non-volatile solid-state memory. In some examples, the memory 41 may include memories that are remotely disposed with respect to the processor 40. These remote memories may be connected to the base station via a network. The examples of the preceding network include, but are not limited to, the Internet, an intranet, a local area network, a mobile communication network, and a combination thereof.

The communications interface 42 may be configured to receive and send data.

An embodiment of the present application further provides a computer-readable storage medium which is configured to store computer programs. When the computer programs are executed by a processor, the method for determining a transmission priority provided in the embodiments of the present application is implemented. The method may be, but is not limited to, the content provided in the preceding method embodiment.

In the embodiment of the present application, the computer storage medium may be any combination of one or more computer-readable media. The computer-readable medium may be a computer-readable signal medium or a computer-readable storage medium. The computer-readable storage medium may be, for example, but is not limited to, an electrical, magnetic, optical, electromagnetic, infrared or semiconductor system, apparatus or device, or any combination thereof. The computer-readable storage medium includes, more specifically, (a non-exhaustive list): an electrical connection involving one or more wires, a portable computer diskette, a hard disk, a random access memory (RAM), a read-only memory (ROM), an electrically erasable, programmable read-only memory (EPROM), a flash memory, an optical fiber, a portable compact disc read-only memory (CD-ROM), an optical storage device, a magnetic storage device, or any suitable combination thereof. In the present application, the computer-readable storage medium may be any tangible medium including or storing a program. The program may be used by an instruction execution system, apparatus, or device or used in conjunction with the instruction execution system, apparatus, or device.

The computer-readable signal medium may include a data signal propagated in a baseband or as part of a carrier, and the data signal carries computer-readable program codes. Such a propagated data signal may be in various forms that include, but are not limited to, an electromagnetic signal, an optical signal, or any suitable combination thereof. The computer-readable signal medium may further be any computer-readable medium other than the computer-readable storage medium. The computer-readable medium may send, propagate or transmit a program used by an instruction execution system, apparatus, or device or used in conjunction with the instruction execution system, apparatus, or device.

Program codes included on the computer-readable medium may be transmitted by using any suitable medium including, but not limited to, a radio medium, a wire, an optical cable, radio frequency (RF) and the like, or any suitable combination thereof.

Computer program codes for executing the operations of the present application may be written in one or more programming languages or a combination of multiple programming languages. The programming languages include object-oriented programming languages such as Java, Smalltalk, C++, Ruby, and Go and may further include conventional procedural programming languages such as a C language or similar programming languages. The program codes may be executed entirely on a user computer, partially on a user computer, as an independent software package, partially on a user computer and partially on a remote computer, or entirely on a remote computer or a server. In the case related to a remote computer, the remote computer may be connected to a user computer via any type of network including a local area network (LAN) or a wide area network (WAN) or may be connected to an external computer (for example, via the Internet through an Internet service provider).

The above are only example embodiments of the present application and are not intended to limit the scope of the present application.

It is to be understood by those skilled in the art that the term, user terminal, encompasses any suitable type of radio user device such as a mobile phone, a portable data processing device, a portable web browser, or a vehicle-mounted mobile station.

Generally, various embodiments of the present application may be implemented in hardware, special-purpose circuitry, software, logics, or any combination thereof. For example, some aspects may be implemented in hardware while other aspects may be implemented in firmware or software executable by a controller, a microprocessor or other computing devices, although the present application is not limited thereto.

The embodiments of the present application may be implemented through the execution of computer program instructions by a data processor of a mobile device, for example, implemented in a processor entity, through hardware, or through a combination of software and hardware. The computer program instructions may be assembly instructions, instruction set architecture (ISA) instructions, machine instructions, machine-related instructions, microcodes, firmware instructions, state setting data, or source or object codes written in any combination of one or more programming languages.

A block diagram of any logic flow among the drawings of the present application may represent program steps, or may represent interconnected logic circuits, modules, and functions, or may represent a combination of program steps and logic circuits, modules, and functions. Computer programs may be stored on a memory. The memory may be of any type suitable for the local technical environment and may be implemented by using any suitable data storage technology, such as, but not limited to, a ROM, a RAM, an optical storage apparatus and system (a digital video disc (DVD) or a compact disc (CD)), and the like. Computer-readable media may include non-transitory storage media. The data processor may be of any type suitable for the local technical environment, such as, but not limited to, a general-purpose computer, a special-purpose computer, a microprocessor, a digital signal processor (DSP), an application-specific integrated circuit (ASIC), a programmable logic device such as a field-programmable gate array (FPGA) and a processor based on multi-core processor architecture.

What is claimed is:

1. A method for determining a transmission priority, comprising:
   determining, by a transmitter, a priority of a Hybrid Automatic Repeat reQuest (HARQ) process; and
   transmitting, by the transmitter, at least one of a traffic channel or a control channel according to the priority of the HARQ process;
   wherein transmitting, by the transmitter, the at least one of the traffic channel or the control channel according to the priority of the HARQ process comprises:
   determining, by the transmitter according to the priority of the HARQ process, a priority of a traffic transmission in the traffic channel carried by the HARQ process, and determining transmission of the traffic transmission by using the priority of the traffic transmission; or
   determining, by the transmitter according to the priority of the HARQ process, a priority of a Hybrid Automatic Repeat reQuest-Acknowledgement (HARQ-ACK) codebook in a control channel, and determining transmission of the HARQ-ACK codebook by using the priority of the HARQ-ACK codebook, wherein the control channel corresponds to a traffic transmission in the traffic channel carried by the HARQ process; or
   determining, by the transmitter according to the priority of the HARQ process, a priority of a traffic transmission in the traffic channel carried by the HARQ process and a priority of an HARQ-ACK codebook in a control channel, determining transmission of the traffic transmission by using the priority of the traffic transmission, and determining transmission of the HARQ-ACK codebook by using the priority of the HARQ-ACK codebook, wherein the control channel corresponds to the traffic transmission in the traffic channel carried by the HARQ process.

2. The method of claim 1, wherein determining, by the transmitter, the priority of the HARQ process comprises:
   determining, by a media access control (MAC) layer of the transmitter, the priority of the HARQ process, and notifying the priority of the HARQ process to a physical layer of the transmitter.

3. The method of claim 2, wherein determining, by the MAC layer of the transmitter, the priority of the HARQ process comprises:
   determining, by the MAC layer of the transmitter according to a highest priority of a logical channel (LCH), a priority of a media access control protocol data unit (MAC PDU) carried by the HARQ process, wherein the LCH is comprised in the MAC PDU; and
   determining, by the MAC layer of the transmitter, the priority of the HARQ process according to the priority of the MAC PDU.

4. The method of claim 3, wherein determining, by the MAC layer of the transmitter according to the highest priority of the LCH comprised in the MAC PDU carried by the HARQ process, the priority of the MAC PDU comprises:
   assigning, by the MAC layer of the transmitter, the highest priority of the LCH comprised in the MAC PDU to the MAC PDU; or
   processing, by the MAC layer of the transmitter according to first convention mapping, the highest priority of the LCH comprised in the MAC PDU to obtain the priority of the MAC PDU.

5. The method of claim 3, wherein determining, by the MAC layer of the transmitter, the priority of the HARQ process according to the priority of the MAC PDU comprises:
   assigning, by the MAC layer of the transmitter, the priority of the MAC PDU to the HARQ process; or
   processing, by the MAC layer of the transmitter according to second convention mapping, the priority of the MAC PDU to obtain the priority of the HARQ process.

6. The method of claim 1, wherein determining, by the transmitter according to the priority of the HARQ process, the priority of the traffic transmission in the traffic channel carried by the HARQ process comprises:
   assigning, by the transmitter, the priority of the HARQ process to the traffic transmission in the traffic channel carried by the HARQ process; or
   processing, by the transmitter according to third convention mapping, the priority of the HARQ process to obtain the priority of the traffic transmission in the traffic channel carried by the HARQ process.

7. The method of claim 1, wherein determining, by the transmitter according to the priority of the HARQ process, the priority of the HARQ-ACK codebook in the control channel corresponding to the traffic transmission in the traffic channel carried by the HARQ process comprises:
   assigning, by the transmitter, the priority of the HARQ process to the HARQ-ACK codebook in the control channel, wherein the control channel corresponds to the traffic transmission in the traffic channel carried by the HARQ process; or
   processing, by the transmitter according to third convention mapping, the priority of the HARQ process to obtain the priority of the HARQ-ACK codebook in the control channel, wherein the control channel corresponds to the traffic transmission in the traffic channel carried by the HARQ process is obtained.

8. The method of claim 1, further comprising: for at least two traffic transmissions, in a case where a first traffic transmission and a second traffic transmission have a processing conflict or an overlap in a time domain:
   in response to determining, by the transmitter, that the first traffic transmission has priority over the second traffic transmission according to a priority of an HARQ process carrying the first traffic transmission and a priority of an HARQ process carrying the second traffic transmission, discarding, by the transmitter, the second traffic transmission, or cancelling transmission of the second traffic transmission, or discarding part of the second traffic transmission, or transmitting part of the second traffic transmission.

9. The method of claim 1, wherein for at least two traffic transmissions, in a case where a first traffic transmission and a second traffic transmission have an overlap in a time domain and an HARQ process carrying the first traffic transmission has a priority equal to a priority of an HARQ process carrying the second traffic transmission:

the first traffic transmission is granted in a manner of dynamic grant, the second traffic transmission is granted in the manner of dynamic grant, and the first traffic transmission has priority over the second traffic transmission, wherein the dynamic grant of the first traffic transmission is later than the dynamic grant of the second traffic transmission; or the first traffic transmission is granted in a manner of dynamic grant, the second traffic transmission is granted in a manner of configured grant, and the first traffic transmission has priority over the second traffic transmission; or the first traffic transmission is granted in a manner of configured grant, the second traffic transmission is granted in the manner of configured grant, and the first traffic transmission has priority over the second traffic transmission, wherein transmission of the first traffic transmission is earlier than transmission of the second traffic transmission.

10. The method of claim 1, wherein

HARQ-ACK corresponding to traffic transmissions having a same HARQ process priority forms an HARQ-ACK codebook; or HARQ-ACK corresponding to traffic transmissions having a same priority forms an HARQ-ACK codebook, wherein a priority of a traffic transmission is determined according to a priority of an HARQ process carrying the traffic transmission; or HARQ-ACK corresponding to traffic transmissions carried by HARQ processes having a priority difference not exceeding a preset level forms an HARQ-ACK codebook; or HARQ-ACK corresponding to traffic transmissions having a priority difference not exceeding a preset level forms an HARQ-ACK codebook, wherein a priority of a traffic transmission is determined according to a priority of an HARQ process carrying the traffic transmission.

11. The method of claim 10, wherein for at least two traffic transmissions, in a case where a physical uplink control channel (PUCCH) of an HARQ-ACK codebook corresponding to a first traffic transmission and a PUCCH of an HARQ-ACK codebook corresponding to a second traffic transmission have an overlap in a time domain, and the HARQ-ACK codebook corresponding to the first traffic transmission and the HARQ-ACK codebook corresponding to the second traffic transmission are allowed to be multiplexed:

placing the HARQ-ACK codebook corresponding to the first traffic transmission before the HARQ-ACK codebook corresponding to the second traffic transmission, wherein the first traffic transmission has priority over the second traffic transmission, or an HARQ process carrying the first traffic transmission has priority over an HARQ process carrying the second traffic transmission.

12. The method of claim 10, further comprising: for at least two traffic transmissions, in a case where a PUCCH of an HARQ-ACK codebook corresponding to a first traffic transmission and a PUCCH of an HARQ-ACK codebook corresponding to a second traffic transmission have an overlap in a time domain, and an HARQ process carrying the first traffic transmission has priority over an HARQ process carrying the second traffic transmission:

cancelling, by the transmitter, a PUCCH transmission of the HARQ-ACK codebook corresponding to the second traffic transmission.

13. An apparatus for determining a transmission priority, comprising a processor and a memory for storing execution instructions that when executed by the processor cause the processor to perform steps in following modules:

a priority determination module, which is configured to determine a priority of a Hybrid Automatic Repeat reQuest (HARQ) process; and a transmission module, which is configured to transmit at least one of a traffic channel or a control channel according to the priority of the HARQ process;

wherein the priority determination module is configured to determine, according to the priority of the HARQ process, a priority of a traffic transmission in the traffic channel carried by the HARQ process; and the transmission module is configured to determine transmission of the traffic transmission by using the priority of the traffic transmission; or the priority determination module is configured to determine, according to the priority of the HARQ process, a priority of a Hybrid Automatic Repeat reQuest-Acknowledgement (HARQ-ACK) codebook in a control channel; and the transmission module is configured to determine transmission of the HARQ-ACK codebook by using the priority of the HARQ-ACK codebook, wherein the control channel corresponds to a traffic transmission in the traffic channel carried by the HARQ process; or the priority determination module is configured to determine, according to the priority of the HARQ process, a priority of a traffic transmission in the traffic channel carried by the HARQ process and a priority of an HARQ-ACK codebook in a control channel; and the transmission module is configured to determine transmission of the traffic transmission by using the priority of the traffic transmission and determine transmission of the HARQ-ACK codebook by using the priority of the HARQ-ACK codebook, wherein the control channel corresponds to the traffic transmission in the traffic channel carried by the HARQ process.

14. The apparatus of claim 13, wherein the priority determination module is configured to determine the priority of the HARQ process through a media access control (MAC) layer and notify the priority of the HARQ process to a physical layer.

15. The apparatus of claim 14, wherein the priority determination module is configured to determine the priority of the HARQ process through the MAC layer by:

determining, through the MAC layer according to a highest priority of a logical channel (LCH), a priority of a media access control protocol data unit (MAC PDU), wherein the LCH is comprised in MAC PDU; and determining, through the MAC layer, the priority of the HARQ process according to the priority of the MAC PDU.

16. The apparatus of claim 15, wherein the priority determination module is configured to determine, according to the highest priority of the LCH comprised in the MAC PDU carried by the HARQ process, the priority of the MAC PDU by:

assigning, through the MAC layer, the highest priority of the LCH comprised in the MAC PDU to the MAC PDU; or processing, through the MAC layer according to first convention mapping, the highest priority of the LCH comprised in the MAC PDU to obtain the priority of the MAC PDU.

17. The apparatus of claim 15, wherein
the priority determination module is configured to determine the priority of the HARQ process according to the priority of the MAC PDU through the MAC layer by:
assigning, through the MAC layer, the priority of the MAC PDU to the HARQ process; or
processing, through the MAC layer according to second convention mapping, the priority of the MAC PDU to obtain the priority of the HARQ process.

18. A non-transitory computer-readable storage medium, which is configured to store computer programs that when the computer programs are executed by a processor cause the processor to perform:
determining, by a transmitter, a priority of a Hybrid Automatic Repeat reQuest (HARQ) process; and
transmitting, by the transmitter, at least one of a traffic channel or a control channel according to the priority of the HARQ process;
wherein transmitting, by the transmitter, the at least one of the traffic channel or the control channel according to the priority of the HARQ process comprises:
determining, by the transmitter according to the priority of the HARQ process, a priority of a traffic transmission in the traffic channel carried by the HARQ process, and determining transmission of the traffic transmission by using the priority of the traffic transmission; or
determining, by the transmitter according to the priority of the HARQ process, a priority of a Hybrid Automatic Repeat reQuest-Acknowledgement (HARQ-ACK) codebook in a control channel, and determining transmission of the HARQ-ACK codebook by using the priority of the HARQ-ACK codebook, wherein the control channel corresponds to a traffic transmission in the traffic channel carried by the HARQ process; or
determining, by the transmitter according to the priority of the HARQ process, a priority of a traffic transmission in the traffic channel carried by the HARQ process and a priority of an HARQ-ACK codebook in a control channel, determining transmission of the traffic transmission by using the priority of the traffic transmission, and determining transmission of the HARQ-ACK codebook by using the priority of the HARQ-ACK codebook, wherein the control channel corresponds to the traffic transmission in the traffic channel carried by the HARQ process.

* * * * *